United States Patent
Zhang et al.

(10) Patent No.: US 11,272,576 B2
(45) Date of Patent: Mar. 8, 2022

(54) HIERARCHICAL BEAMFORMING STRUCTURE AND TRANSMISSION OF BEAM INDICATION TO IMPROVE DEVICE MOBILITY AND REDUCE NETWORK TRAFFIC OVERHEAD IN NEW RADIO (NR)

(71) Applicant: Apple Inc., Cupertino, CA (US)

(72) Inventors: Wei Zhang, Santa Clara, CA (US); Haitong Sun, Irvine, CA (US); Wei Zeng, San Diego, CA (US); Yuchul Kim, Santa Clara, CA (US); Dawei Zhang, Saratoga, CA (US); Sami M. Almalfouh, San Jose, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/245,389

(22) Filed: Jan. 11, 2019

(65) Prior Publication Data
US 2019/0254120 A1    Aug. 15, 2019

Related U.S. Application Data

(60) Provisional application No. 62/631,349, filed on Feb. 15, 2018.

(51) Int. Cl.
*H04W 4/00*      (2018.01)
*H04W 88/10*    (2009.01)
(Continued)

(52) U.S. Cl.
CPC .......... *H04W 88/10* (2013.01); *H04B 7/0617* (2013.01); *H04B 7/088* (2013.01);
(Continued)

(58) Field of Classification Search
None
See application file for complete search history.

(56) References Cited

U.S. PATENT DOCUMENTS

| | | | |
|---|---|---|---|
| 2015/0223208 A1* | 8/2015 | Park | H04L 5/001 370/329 |
| 2016/0128037 A1* | 5/2016 | Park | H04L 5/0094 370/312 |

(Continued)

FOREIGN PATENT DOCUMENTS

| | | |
|---|---|---|
| WO | WO 2017/164933 A1 | 9/2017 |
| WO | WO2018/212606 A1 | 11/2018 |

OTHER PUBLICATIONS

Samsung; "Discussion on beam indication for PDSCH"; 3GPP Draft; R1-1717612, 3rd Generation Partnership Project (3GPP), Mobile Competence Centre; 650, Route Des Lucioles ; F-06921 Sophia-Antipolis Cedex; France; vol. RAN WG1, No. Prague, Czech; Oct. 2, 2017, XP051352474, five pages.

(Continued)

*Primary Examiner* — Zewdu A Beyen
(74) *Attorney, Agent, or Firm* — Kowert, Hood, Munyon, Rankin & Goetzel, P.C.

(57) ABSTRACT

A hierarchical beamforming structure may help reduce network traffic overhead for transmission of beam indication (information) and enable efficient Transmission Configuration Indication, while facilitating beam tracking between a base station(s) and a mobile device(s) during downlink communications. Downlink control information (DCI) may be expanded to carry/transmit a beam/QCL (quasi co-location) indication for a control resource set (CORESET) for monitoring a next instance of a physical control channel. Error resilient design techniques may be employed to further improve device mobility while increasing the flexibility and reducing the latency for GC-PDCCH/PDCCH beam/QCL (Continued)

indications. For example, the aggregation level for select DCI (e.g. DCI in which the GC-PDCCH/PDCCH beam indication has changed) may be increased, the transmission of such select DCI may be limited to a certain (specified) aggregation level, and in case discontinuous transmission (DTX) is received, the base station may transmit both old and new beam/QCL indications.

20 Claims, 11 Drawing Sheets

(51) Int. Cl.
| | |
|---|---|
| H04W 28/06 | (2009.01) |
| H04B 7/06 | (2006.01) |
| H04W 72/04 | (2009.01) |
| H04W 24/08 | (2009.01) |
| H04W 16/28 | (2009.01) |
| H04W 80/02 | (2009.01) |
| H04W 4/80 | (2018.01) |
| H04B 7/08 | (2006.01) |
| H04B 7/0413 | (2017.01) |

(52) U.S. Cl.
CPC ............ *H04W 4/80* (2018.02); *H04W 16/28* (2013.01); *H04W 24/08* (2013.01); *H04W 28/06* (2013.01); *H04W 72/042* (2013.01); *H04W 72/046* (2013.01); *H04W 80/02* (2013.01); *H04B 7/0413* (2013.01)

(56) References Cited

U.S. PATENT DOCUMENTS

| | | |
|---|---|---|
| 2018/0219605 A1 | 8/2018 | Davydov |
| 2018/0219606 A1 | 8/2018 | Ng |
| 2018/0343653 A1* | 11/2018 | Guo ...................... H04L 5/0053 |

OTHER PUBLICATIONS

International Search Report and Written Opinion, Application No. PCT/US2019/017840, dated May 3, 2019, 11 pages.
International Search Report and Written Opinion, Application No. PCT/US2019/017840, dated Aug. 6, 2019, 19 pages.
Ericsson; "On PDCCH for Ultra-Reliable Transmission"; 3GPP Draft; R1-1800961; 3rd Generation Partnership Project (3GPP); Mobile Competence Centre; 650, Route Des Lucioles; F-06921 Sophia-Antipolis Cedex; France; vol. RAN WG1, No. Vancouver, Canada; Jan. 13, 2018; five pages.
Mediatek Inc; "Beam Indication with Low Overhead Consideration"; 3GPP Draft; RI-1714562; 3rd Generation Partnership Project (3GPP); Mobile Competence Centre; 650, Route Des Lucioles; F-06921 Sophia-Antipolis Cedex; France; vol. RAN WG1, No. Prague, Czech; Aug. 17, 2017; four pages.
Office Action for JP Patent Application No. 2020-543142; dated Oct. 11, 2021.
Ericsson "On beam indication, measurement, and reporting"; 3GPP TSG-RAN WG1 NR Ad Hoc #3 R1-1716350; Nagoya, Japan; Sep. 18-21, 2017.
CMCC "Considerations on beam reporting and beam indication"; 3GPP TSG RAN WG1 Meeting 90bis, R1-1717880; Prague, CZ; Oct. 9-13, 2017; 4 pages.
Qualcomm Incorporated "Multi-beam control operation"; 3GPP TSG RAN WG1 #90, R1-1713420; Prague, CZ, Aug. 21-25, 2017; 6 pages.

* cited by examiner

HIERARCHICAL BEAMFORMING STRUCTURE AND TRANSMISSION OF BEAM INDICATION TO IMPROVE DEVICE MOBILITY AND REDUCE NETWORK TRAFFIC OVERHEAD IN NEW RADIO (NR)

PRIORITY CLAIM

This application claims benefit of priority of U.S. Provisional Patent Application Ser. No. 62/631,349 titled "Hierarchical Beamforming Structure and Transmission of Beam Indication to Improve Device Mobility and Reduce Network Traffic Overhead in New Radio (NR)", filed on Feb. 15, 2018, which is hereby incorporated by reference as though fully and completely set forth herein.

FIELD OF THE INVENTION

The present application relates to wireless communications, and more particularly to a hierarchical beamforming structure in wireless communications, e.g. in 3GPP New Radio (NR) communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH', etc. A proposed next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In many instances, modern wireless communications networks use MIMO (multiple-in-multiple-out) technology to achieve high data rates. One MIMO technique is beamforming, which permits targeted illumination of specific areas, making it possible to improve transmission to users at the far edges of cellular coverage. Many wireless communications standards such as WLAN and WiMAX™, LTE and NR incorporate beamforming among their many features. Beamforming is particularly important for the time division duplex (TDD) mode in LTE and NR.

Transmit beamforming uses multiple antennas to control the direction of a wave (front) by appropriately weighting the magnitude and phase of individual antenna signals. This makes it possible to provide better coverage to specific areas along the cell edges, with every antenna in the array contributing to the steered signal, thereby achieving an array gain, also referred to as a beamforming gain. Receive beamforming makes it possible to determine the direction from which the wave (front) arrives, and suppress selected interfering signals by applying a beam pattern null in the direction of the interfering signal. Adaptive beamforming is a technique for continually applying beamforming to a moving receiver, which typically requires rapid signal processing and powerful algorithms.

Analog/digital hybrid beamforming is enabled by smaller antenna element size and thus features prominently in at least NR wireless communications. Beam management is important to combat propagation loss for reliable communications, especially for millimeter wave (mmWave) systems. Part of beam management involves the communication of beamforming information (e.g. a beam indication) between wireless communication devices, for example between user equipment devices (UEs) and cellular base stations. While various present day beamforming structures and methods of communicating beam indication (beamforming information) have proven reliable under various conditions, there is room for improvement in how beamforming structures are defined and beam indication information is transmitted/received for devices performing frequent data transmissions in a rapidly changing environment.

Other corresponding issues related to the prior art will become apparent to one skilled in the art after comparing such prior art with the disclosed embodiments as described herein.

SUMMARY OF THE INVENTION

Embodiments are presented herein of, inter alia, of methods for implementing transmission of a beam indication (or beam/QCL (quasi co-location) indication) and a hierarchical beamforming structure that improve wireless communication device (UE) mobility and reduce network traffic overhead during wireless communications, for example during 3GPP New Radio (NR) communications. Embodiments are further presented herein for wireless communication systems containing user equipment (UE) devices and/or base stations communicating with each other within the wireless communication systems. In some embodiments, the beam indication (or beam indication information or beamforming information) for a current physical data channel and a next physical control channel, e.g. for a current physical downlink shared channel (PDSCH) and a next physical data control channel (PDCCH), may be transmitted/carried as control information, e.g. in a downlink control information (DCI) element. The beam/QCL indication (information) in the DCI may provide an indication of transmit (TX) beamforming used by a base station. Upon receiving the beam indication (beam/QCL indication), the UE may determine which receive beamforming configuration to adopt to receive the current data channel and the next control channel (information). In other words, the UE may receive the current data and/or the next control channel according to beamforming performed based at least on the received beam (beam/QCL) indication.

Pursuant to the above, in some embodiments, DCI may be expanded to carry/transmit beam/QCL indications not only for a current physical data channel, but also for a next physical control channel, e.g. for GC-PDCCH and/or PDCCH. (As used herein, "GC-PDCCH and/or PDCCH" is also simply referred to as "GC-PDCCH/PDCCH", and "beam indication and/or QCL indication" is also simply referred to as "beam indication" or "beam/QCL indication"). Accordingly, a beam/QCL indication may be enabled in DCI for the next GC-PDCCH/PDCCH control resource set (CORESET) monitoring for downlink (DL) grants. Furthermore, device mobility may be improved by increasing the flexibility and reducing the latency for a GC-PDCCH/PDCCH beam/QCL indication through more error resilient design techniques. For example, the aggregation level for DCI in which (or DCI which indicates that) the GC-PDCCH/PDCCH beam indication (or beam/QCL indication) has changed may be increased, the transmission of DCI in which (or DCI which indicates that) the GC-PDCCH/PDCCH beam/QCL indication has changed may be limited to a specified aggregation level, and in case a discontinuous transmission (DTX) is received by the base station (e.g. gNB) instead of an acknowledgment (ACK) or non-acknowledgment (NACK), the base station may transmit both old and new beam/QCL indications. Furthermore, a hierarchical beamforming structure may be implemented to reduce network traffic overhead for beam indication transmission, and to facilitate beam tracking between the base station (e.g. gNB) and the UE during DL communications. The use of hierarchical beamforming may thereby reduce the overhead for transmit/receive (TX/RX) beam tracking/update efforts, while enabling efficient Transmission Configuration Indication (TCI).

Accordingly, in some embodiments, a device may receive, via wireless communications from a base station, e.g. from a gNB, DCI that includes beamforming information carrying a beam indication for a control resource set for monitoring a next instance of a physical control channel, and may subsequently monitor the next instance of the physical control channel using a receive beamforming configuration based on the received beam indication. The DCI may include a transmission configuration indication (TCI) state field, with the beam indication provided in the TCI state field. The beam indication may be according to a specified number of bits that correspond to a beam resolution of a cell in which the wireless communications are conducted. The physical control channel may be a physical downlink control channel and/or a group common physical downlink control channel. When the beam indication represents a change from a previous beam indication received by the device in a previous DCI, the aggregation level for the DCI may be set higher than an aggregation level of the previous DCI, and transmission of the DCI may be limited to a specified aggregation level to reduce the possibility of a false cyclic redundancy check pass. In some embodiments, the beam indication includes information representative of a hierarchical beamforming structure.

In some embodiments, a base station (e.g. gNB) may wirelessly transmit, to a device, DCI carrying beamforming information that includes a beam indication representative of a hierarchical beamforming structure. The beam indication may be used by the device to derive, during a receive beam sweep/update, receive beams that correspond to higher order channels of multiple different channels from receive beams that correspond to lower order channels of the multiple different channels. For each respective channel of the multiple different channels, respective beams corresponding to the channel may occupy a corresponding hierarchical level of the hierarchical beamforming structure. In some embodiments, a beam resolution at the base station may increase monotonically for the multiple different channels organized in a high to low channel order, with the beam resolution increasing monotonically as the channel order decreases. In some embodiments, at least two beams corresponding to a first channel of the multiple different channels may have a same corresponding child beam, with the child beam corresponding to a second channel of the multiple different channels and occupying a lower hierarchical level of the hierarchical beamforming structure than the two beams. The DCI may include a TCI state field, with the beam indication provided in the TCI state field, and the number of bits used in the TCI state field corresponding to a number of beams supported for a physical data channel.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
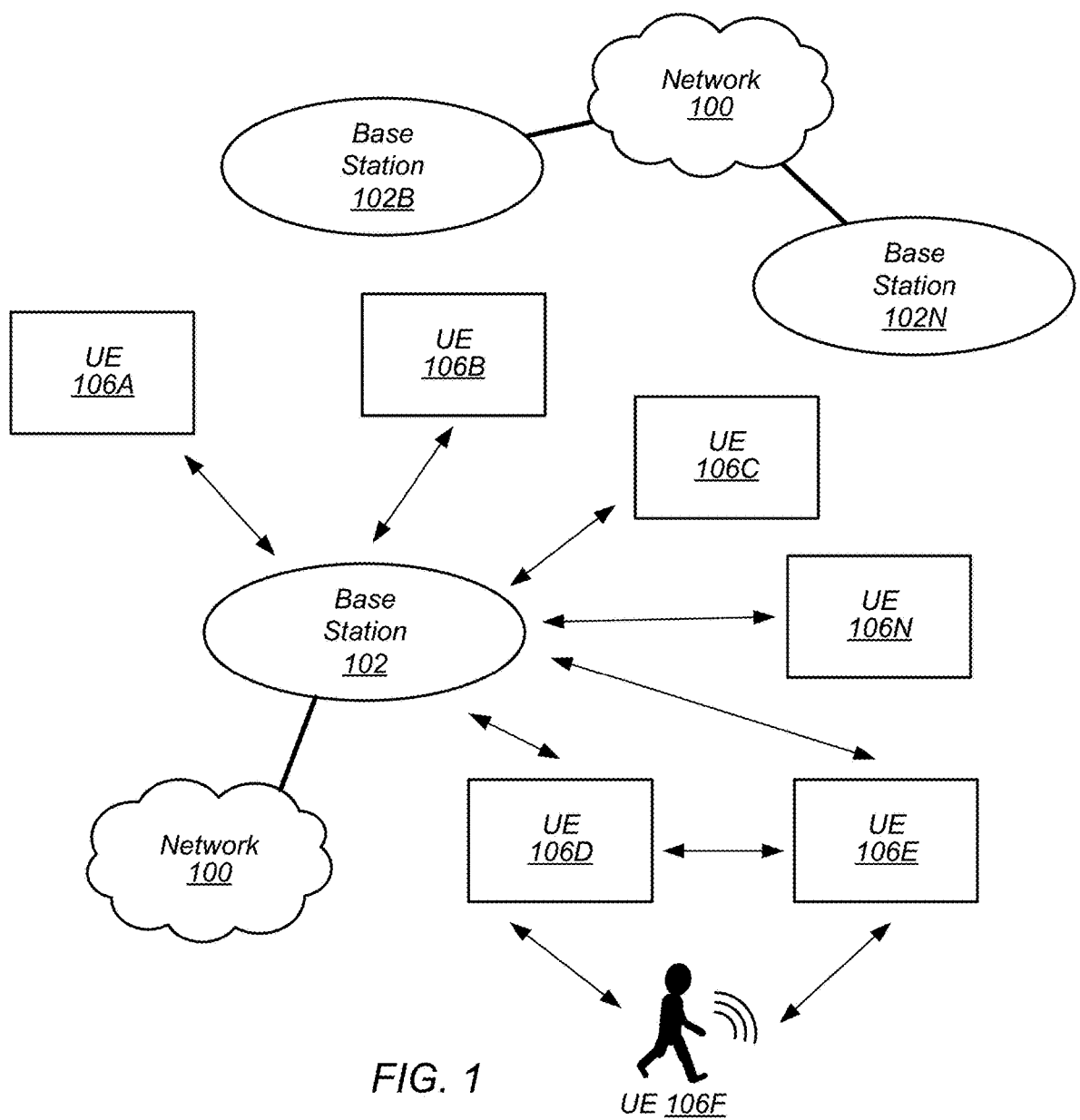
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

APR: Applications Processor
BS: Base Station
BSR: Buffer Size Report
CMR: Change Mode Request
CRC: Cyclic Redundancy Check
DCI: Downlink Control Information
DL: Downlink (from BS to UE)
DYN: Dynamic
FDD: Frequency Division Duplexing
FT: Frame Type
GC-PDCCH: Group Common Physical Downlink Control Channel
GPRS: General Packet Radio Service
GSM: Global System for Mobile Communication
GTP: GPRS Tunneling Protocol
IR: Initialization and Refresh state
LAN: Local Area Network
LTE: Long Term Evolution
MAC: Media Access Control
MAC-CE: MAC Control Element
MIB: Master Information Block
MIMO: Multiple-In Multiple-Out
OSI: Open System Interconnection
PBCH: Physical Broadcast Channel
PDCCH: Physical Downlink Control Channel
PDCP: Packet Data Convergence Protocol
PDN: Packet Data Network
PDSCH: Physical Downlink Shared Channel
PDU: Protocol Data Unit
QCL: Quasi Co-Location
RACH: Random Access Procedure
RAT: Radio Access Technology
RF: Radio Frequency
RMSI: Remaining Minimum System Information
ROHC: Robust Header Compression
RRC: Radio Resource Control
RTP: Real-time Transport Protocol
RX: Reception/Receive
SID: System Identification Number
SGW: Serving Gateway
SSB: Synchronization Signal Block
TBS: Transport Block Size
TCI: Transmission Configuration Indication
TDD: Time Division Duplexing
TX: Transmission/Transmit
UE: User Equipment
UL: Uplink (from UE to BS)
UMTS: Universal Mobile Telecommunication System
Wi-Fi: Wireless Local Area Network (WLAN) RAT based on the Institute of Electrical and Electronics Engineers' (IEEE) 802.11 standards
WLAN: Wireless LAN

Terms

The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing one or more functions in a device, e.g. in a user equipment device or in a cellular network device, and/or cause the user equipment device or cellular network device to perform one or more functions. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
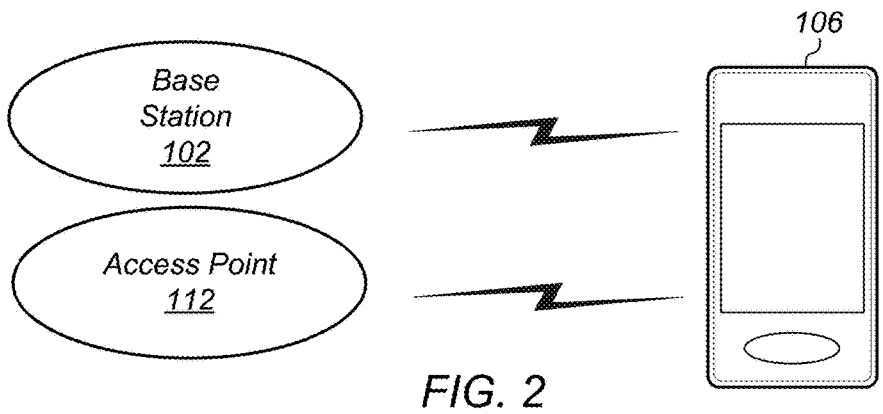
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A, 106B, etc., through 106N. Each of the user devices may be referred to herein as a "user equipment" (UE) or UE device. Thus, the user devices 106 are referred to as UEs or UE devices. Various ones of the UE devices may implement a hierarchical beamforming structure, and transmission of beam/QCL (quasi co-location) indication information according to various embodiments disclosed herein.

The base station 102 may be a base transceiver station (BTS) or cell site, and may include hardware that enables wireless communication with the UEs 106A through 106N. The base station 102 may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102 may facilitate communication between the user devices and/or between the user devices and the network 100. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'. In some embodiments, the base station 102 communicates with at least one UE, implementing a hierarchical beamforming structure, and transmission of beam/QCL (quasi co-location) indication information according to various embodiments disclosed herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE 106 communicating with one or more network nodes considered to be a part of the network and which may interact with the UE 106 to conduct communications with the UE 106 and in some cases affect at least some of the communication parameters and/or use of communication resources of the UE 106.

Furthermore, as also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting with the vehicles represented by UEs 106D and 106E in a similar manner.

FIG. 2 illustrates an exemplary user equipment 106 (e.g., one of the devices 106-A through 106-N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antenFnas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH'. Other configurations are also possible.

Figure 3:
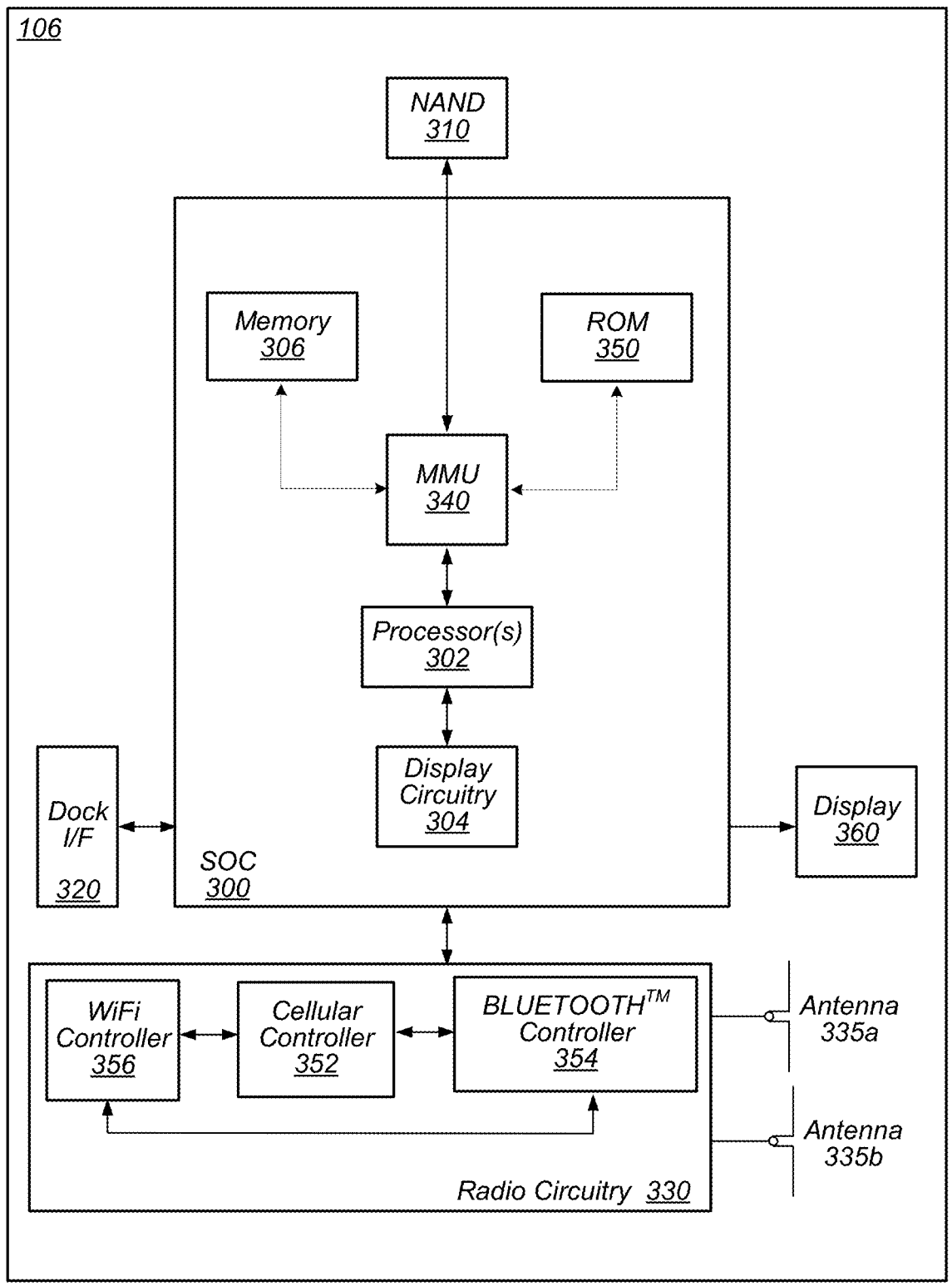
FIG. 3 illustrates an exemplary block diagram of a UE, according to some embodiments.

FIG. 3—Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for UE 106 to use a hierarchical beamforming structure, and receive beam/QCL indication(s) according to various embodiments disclosed herein. Thus, in some embodiments, UE 106 may perform beamforming according to a hierarchical beamforming, and may also receive a beam indication (or beam indication information or beamforming information) for a current physical data channel and a next physical control channel, e.g. for a current physical downlink shared channel (PDSCH) and a next PDCCH, as control information, e.g. in a downlink control information (DCI) element. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Specifically, processor(s) 302 may be coupled to and/or may interoperate with other components as shown in FIG. 3, to implement communications by UE 106 that incorporate the hierarchical beamforming structure and the communicating of a beam/QCL indication according to various embodiments disclosed herein. Processor(s) 302 may also implement various other applications and/or end-user applications running on UE 106.

Figure 5:
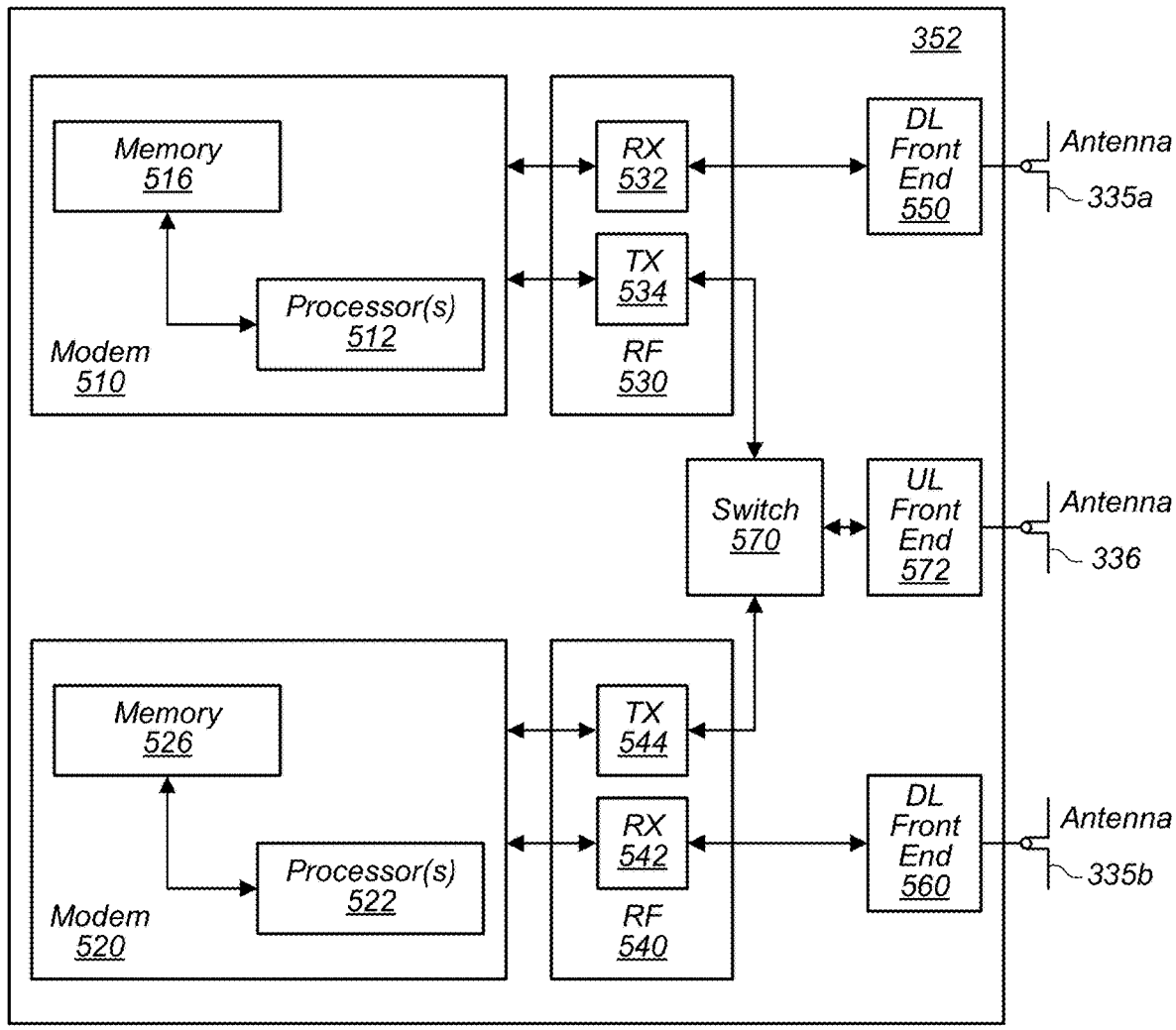
FIG. 5 shows an exemplary simplified block diagram illustrative of cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 as further described below.

Figure 4:
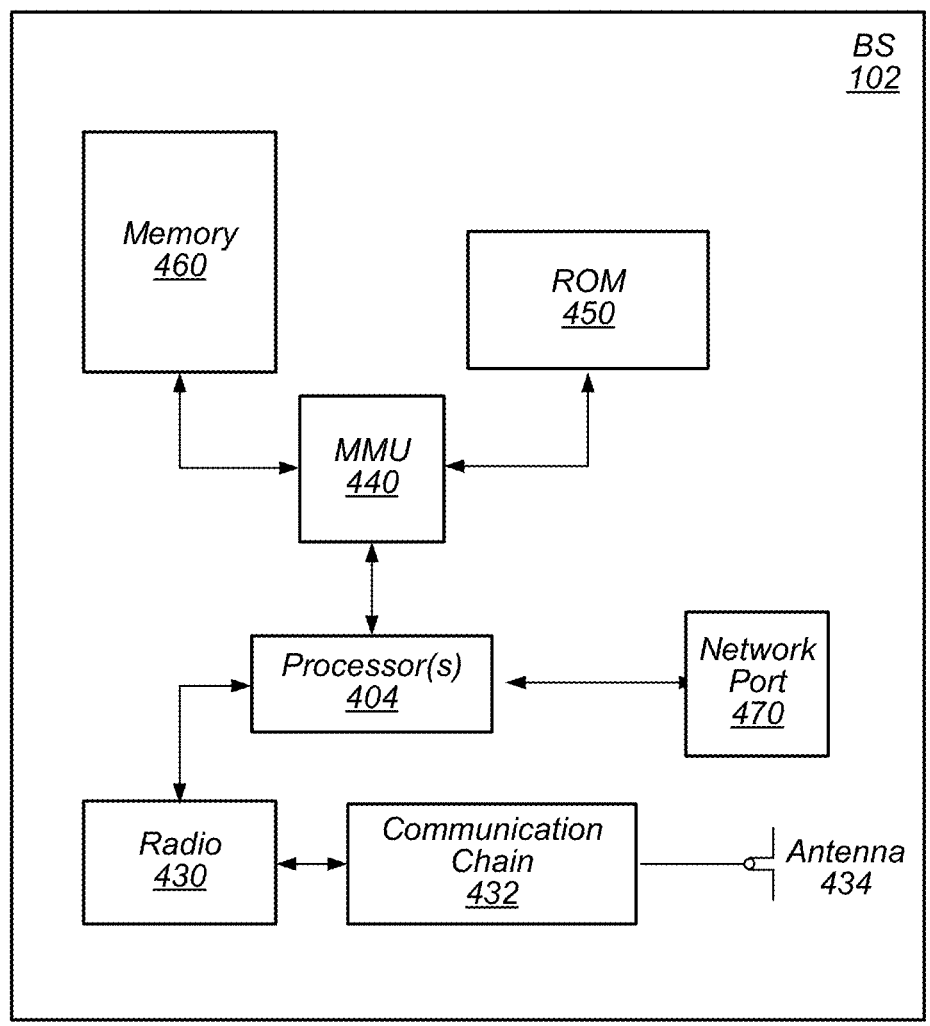
FIG. 4 illustrates an exemplary block diagram of a base station, according to some embodiments.

FIG. 4—Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device in a manner consistent with embodiments of a hierarchical beamforming structure and communication (transmission) of a beam/QCL indication disclosed herein. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods and embodiments as disclosed herein for implementing a hierarchical beamforming structure and communication (transmission) of a beam/QCL indication.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Figure 6:
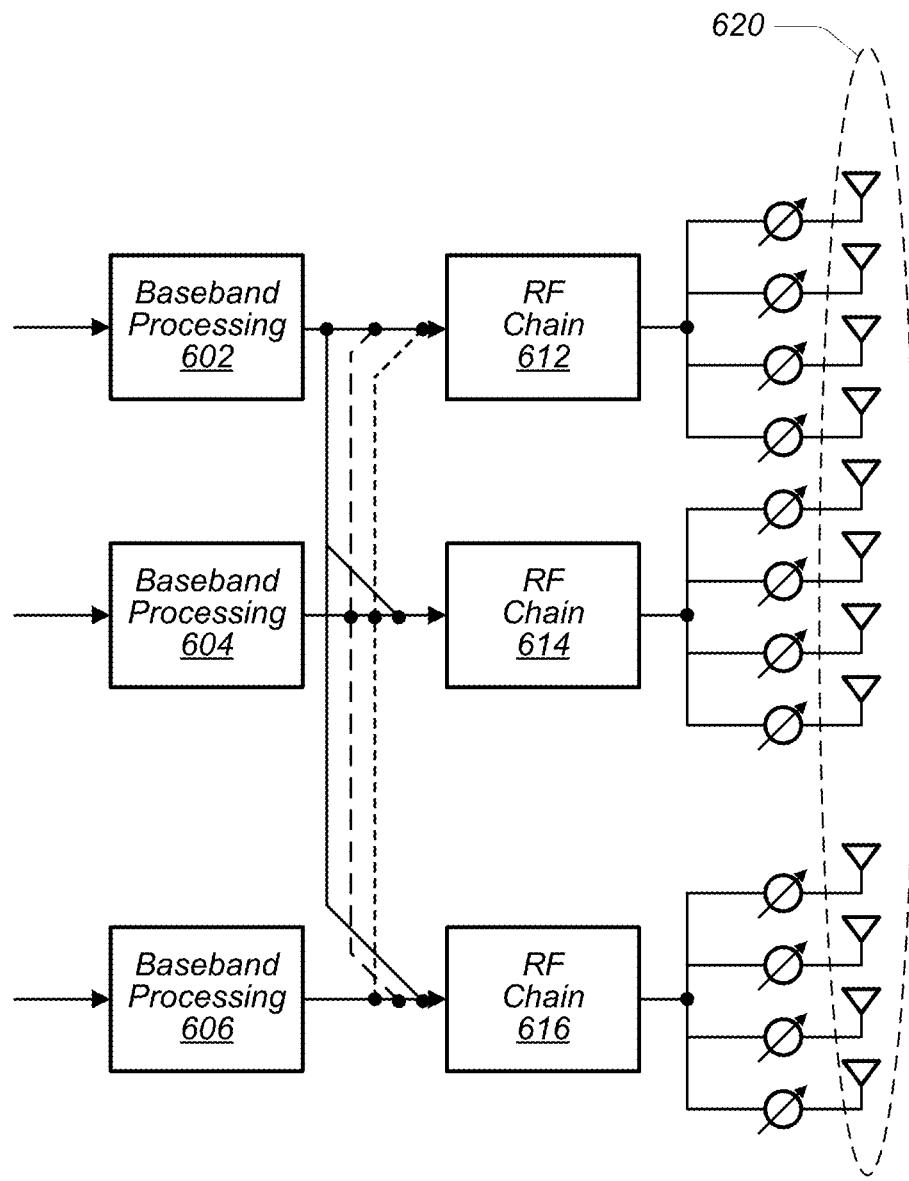
FIG. 6 illustrates an exemplary beamforming hardware arrangement, according to prior art.
Figure 7:
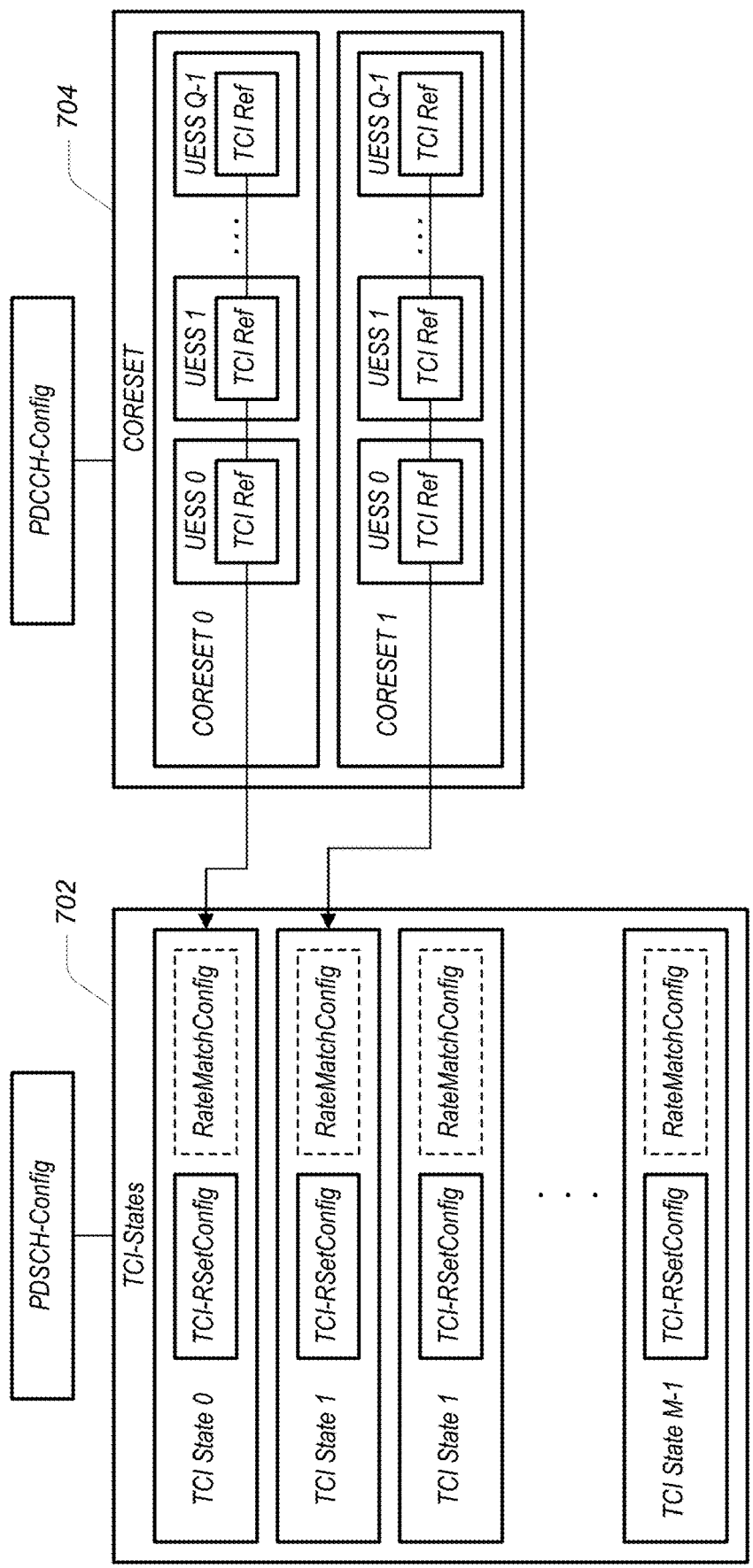
FIG. 7 shows an exemplary diagram illustrating the configuration of a beam/QCL (quasi co-location) indication by the TCI (transmission configuration information) state field in the DCI (downlink control information)

FIGS. 6 and 7—Beamforming Information—Beam Indication

FIG. 6 illustrates an exemplary beamforming arrangement. As illustrated in FIG. 6, beamforming may be employed to transmit different broadband signals originating from baseband processing units 602, 604, and 606 over a number of (in this case three) respective radio frequency (RF) chains 612, 614, and 616, utilizing a number of (in this case 12) antennas 620, with, each RF chain coupling to a respective number of (in this case four) antennas. The beamforming arrangement of FIG. 6 may represent hybrid beamforming, (i.e., analog/digital beamforming), which is enabled by smaller antenna element size and is thus widely used for certain wireless communications, for example for 5G-NR communications. Beam management is important to combat propagation loss for reliable communications, especially for millimeter wave (mmWave) systems.

Different channels/reference symbols may have different requirements associated with beamforming robustness and latency, and they may thus also have different beam/QCL (quasi-co-location) indications. The master information block (MIB) is carried by physical broadcast channel(s) (PBCH) in Synchronization Signal Blocks (SSBs). SSBs with a different block time index in the same burst may be transmitted on different cell specific beams. Beam/QCL indications (also collectively referred to as beamforming information) may be for Group Common PDCCH (GC-PDCCH) and PDCCH. Each UE may be configured with control resource sets for a UE specific search space and for a common search space, e.g. Type 0/Type 0A/Type 1/Type 2 common search space, and/or Type 3 common search space. The Type 0/Type 0A/Type 1/Type 2 common search space has the same beam/QCL as the associated SSB. Specific beams/QCL may be configured through Radio Resource Control (RRC) signaling and/or RRC+MAC-CE signaling for GC-PDCCH in a Type 3 common search space carrying SFI (slot format indication), and for PDCCH in a UE specific search space.

The beam/QCL indication for PDSCH may be configured in the Transmission Configuration Indication (TCI) state field in DCI, as illustrated in FIG. 7. Through RRC signaling, a UE may be configured with a list of up to a specified number (M) of TCI states 702, and each TCI state may be configured with one reference signal (RS) set. The different TCI states are illustrated in FIG. 7 as TCI State 0 through TCI state M−1. The QCL reference for PDSCH is dynamically indicated by the TCI field of the DCI. As also shown in FIG. 7, each "TCI-RSetConfig" indicates the DL RS in the RS set for the corresponding TCI state, providing the QCL reference. At least the spatial QCL reference may be dynamically updated. The QCL reference for PDCCH may be provided by a semi-statically configured reference to a TCI state. For mmWave, the TCI reference may be the same for all UE-specific search spaces within a control resource set (CORESET), with the CORESETS collectively indicated in 704. The TCI field in DCI may occupy two (2) or three (3) bits. There may be support for at least the explicit approach for the update of spatial QCL reference in a TCI state through RRC signaling and/or MAC-CE signaling. The UE may associate one receive (RX) beam with each TCI state during beam synchronization.

Beam Indication Considerations

Presently, PDSCH (which represents a physical data channel) uses the TCI field in DCI for the beam/QCL indication. This provides fast adaptation to UE position/direction changes, and allows for a quick response from the base station (e.g. from the gNB) to the UE beam quality report. Presently, GC-PDCCH/PDCCH (which represent physical control channels) use RRC signaling and/or RRC+MAC-CE signaling for the beam/QCL indication, which incurs a longer turnaround time, higher traffic overhead, and is also more vulnerable to fast beam-quality changes. The use of an RRC+MAC-CE signaling approach is more suitable for a UE that is in a relatively stable state, and is not a good option for frequent data transmissions in a rapidly changing environment, e.g. when the UE is continually or frequently changing its location. Therefore, it may be advantageous to add a GC-PDCCH/PDCCH beam indication in DCI, for example by adding extra bits in the DCI, especially for higher beam resolution.

Higher beam resolution (a larger number of beam/QCL candidates) may improve link quality between the UE and the base station (e.g. a gNB), but may also be more vulnerable to fast beam-quality changes. Different channels carrying different type of information may be implemented via different beam-resolution based on reliability/audiences. For example, broadcasting channels (channels that are broadcasting) may in general adopt wide beams instead of UE-dedicated narrow beams. It is worth noting that RMSI/OSI/RACH/Page information may have the same beam resolution as SSB. Furthermore, GC-PDCCH beam resolution may be no worse than SSB, and GC-PDCCH may not require higher beam resolution than PDCCH. Additionally, the width of PDCCH beams may be greater than or equal to the width of PDSCH. Therefore, the updating of the RX beam for different channels may not lead to extra and/or duplicated efforts, and different beams/QCL for different channels may be designed/organized in a systematic and scalable fashion.

Expanding DCI to Indicate Beam/QCL for DC-PDCCH/PDCCH Monitoring

Pursuant to the above considerations, a beam/QCL indication may be enabled in DCI for a next GC-PDCCH/PDCCH control resource set (CORESET) monitoring for DL grants, in addition to providing the beam/QCL indication for PDSCH for a current GC-PDCCH/PDCCH control resource set. Beam/QCL indication may be included for the next GC-PDCCH/PDCCH monitoring instance and instances thereafter, as illustrated in timeline 850 in FIG. 8. In some embodiments, the existing DCI formats for DL grants (e.g., formats 1_0 and 1_1) may be modified to include an indication according to a specified number of bits (e.g. an N-bit indication, where N may depend on the beam resolution of the cell). By default, this does not lead to any changes on the PDCCH for DCI formats (e.g., formats 2_0 and 2_1) that do not include a beam indication. Inclusion of a GC-PDCCH/PDCCH beam indication in DCI enables fast response to beam-quality changes between the base station (e.g. gNB) and the UE. In case the GC-PDCCH/PDCCH beam/QCL indication is used because of low PDSCH traffic, it is still possible to use the MAC-CE option.

Figure 8:
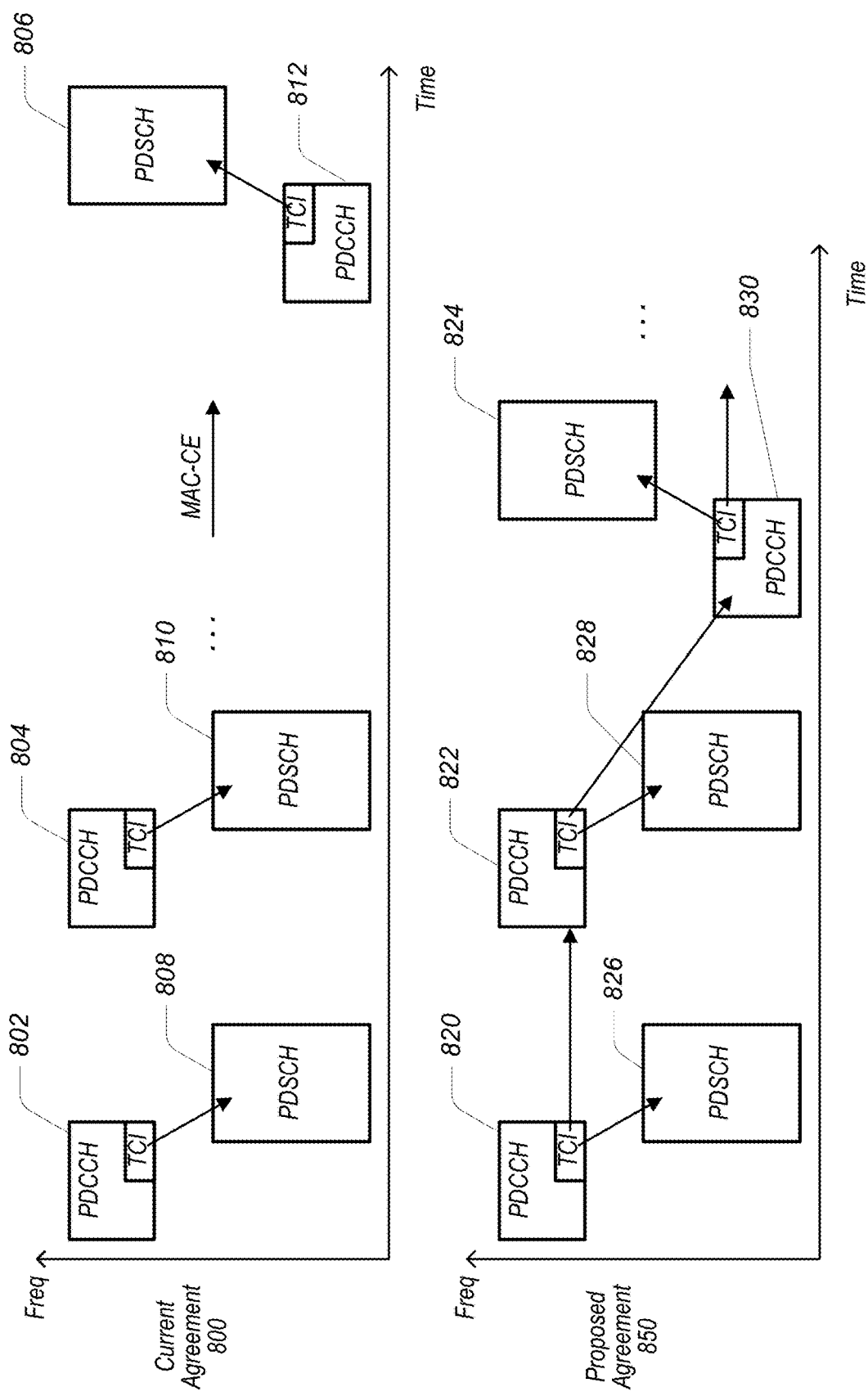
FIG. 8 shows an exemplary timing diagram illustrating the transmission of a beam/QCL indication according to a current agreement, and a proposed agreement configured according to some embodiments.

As seen in FIG. 8, in the current agreement timeline 800, a beam/QCL indication in TCI is only configured for PDSCH, which corresponds to a current control resource set, with a beam/QCL indication for PDCCH achieved via MAC-CE signaling. For example, PDCCH 802 may carry a beam/QCL indication in TCI configured for PDSCH 808, and PDCCH 804 may carry a beam/QCL indication in TCI configured for PDSCH 810. A beam/QCL indication for PDCCH 812 may be achieved via MAC-CE signaling as shown, with PDCCH 812 carrying a beam/QCL indication in TCI configured for PDSCH 806.

In contrast, according to various embodiments, as illustrated in the proposed agreement timeline 850, a beam/QCL indication may be included in TCI not only for the PDSCH for the current PDCCH but also for the next GC-PDCCH/PDCCH monitoring instance and instances thereafter. For example, PDCCH 820 may carry a beam/QCL indication in TCI configured for PDSCH 808, and it may also carry a beam/QCL indication in TCI configured for PDCCH 822. Similarly, PDCCH 822 may carry a beam/QCL indication in TCI configured for PDSCH 828, and it may also carry a beam/QCL indication in TCI configured for PDCCH 830. PDCCH 830 may carry a beam/QCL indication in TCI configured for PDSCH 824 as well as a beam/QCL indication in TCI configured for a next PDCCH (not shown).

Error Resilient Design

Various aspects of providing the beam/QCL indication may further be improved through error resilient design considerations. A variety of problems may be encountered during wireless communications, and further improving the provisioning of beam/QCL indications through error resilient design may therefore also further improve wireless communications. For example, in some cases a false CRC pass for PDCCH may cause an unexpected PDCCH beam change. That is, a false pass for a CRC (or false CRC pass) may lead to incorrect GC-PDCCH/PDCCH beam/QC monitoring. For more error resilient design, in some embodiments, the aggregation level for select DCI, e.g. for DCI in which the GC-PDCCH/PDCCH beam indication has changed, may be increased to facilitate the UE's more reliably obtaining the changed beam/QCL indication. In some embodiments, if a current beam/QCL indication is the same as a most recent previous beam/QCL indication, the aggregation level for DCI may be selected/specified to be any desired value. If there is a beam/QCL indication change, the DCI carrying the changed beam/QCL indication may be specified/selected to have a higher aggregation level. In addition, the transmission of select DCI, e.g. DCI in which the GC-PDCCH/PDCCH beam/QCL indication has changed, may be limited to certain (specified) aggregation levels, which may reduce the possibility of a false error-check pass, e.g. a false pass for a CRC (or false CRC pass), thereby reducing the possibility having the wrong beam/QCL GC-PDCCH/PDCCH monitored. For example, in some embodiments, the DCI carrying a changed beam/QCL indication may be limited to one specified aggregation level, and only DCI with that specified aggregation level may carry a changed beam/QCL indication.

Figure 9:
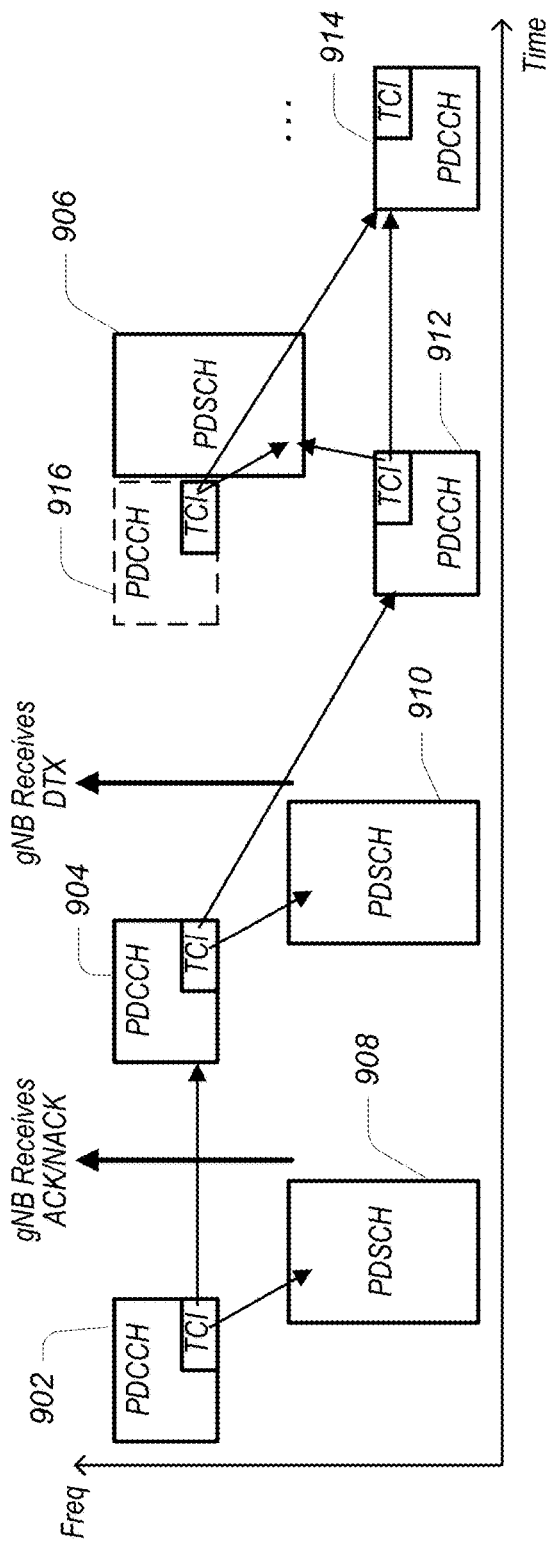
FIG. 9 shows an exemplary timing diagram illustrating the transmission of a beam/QCL indication, implemented with additional features for increased error resiliency, according to some embodiments.

In some embodiments, for certain DCI formats that include a GC-PDCCH/PDCCH beam indication, for example, for DCI format 1_0 and 1_1, the base station (e.g. gNB) may change the PDCCH scheduling in a next instance if an ACK or NACK is received for the current DCI that is carrying a changed beam/QCL indication. In case the base station receives a discontinuous transmission (DTX) instead of an ACK or NACK, the base station may transmit both old and new QCL resources, ensuring that regardless of whether or not the UE receives the new PDCCH beam, the UE may receive the PDCCH beam correctly. The same may also apply to MAC-CE based beam change indication(s). This is illustrated in FIG. 9, which shows an exemplary timing diagram illustrating the transmission of a beam/QCL indication, implemented with additional features for increased error resiliency, according to some embodiments. As shown in FIG. 9, PDCCH 902 may carry a beam/QCL indication in TCI configured for PDSCH 908, and it may also carry a beam/QCL indication in TCI configured for PDCCH 904. The beam/QCL indication configured for PDCCH 904 may be a changed beam/QCL indication with respect to a previously transmitted beam/QCL indication. Upon receipt of ACK/NACK from the UE for PDSCH 908, the base station transmits PDCCH 904 according to the new QCL resources.

In the example shown, the beam/QCL indication carried by PDCCH 902 in TCI configured for PDCCH 912 may be a changed beam/QCL indication with respect to the beam/QCL indication carried by PDCCH 904 in TCI configured for PDCCH 912. Upon receipt of a DTX from the UE for PDSCH 910, the base station transmits both old and new QCL resources to ensure that the UE receives the PDCCH beam correctly. Specifically, the base station (e.g. gNB) transmits PDCCH 916 according to the old QCL resources which were carried by PDCCH 902 in TCI configured for PDCCH 904, and also according to the new QCL resources which were carried by PDCCH 904 in TCI configured for PDCCH 912. Both PDCCH 916 and PDCCH 912 may also carry beam/QCL indication in TCI configured for PDSCH 906, and PDCCH may also carry beam/QCL indication in TCI configured for PDCCH 914.

Hierarchical Beamforming Structure

In some embodiments, the beams may be organized into a hierarchical structure. Organizing base station transmit-beams (e.g., gNB transmit-beams, TX beams) for different channels into a hierarchical structure may reduce network traffic overhead for the transmission of beam indication (information), and may also facilitate beam tracking between the base station and the UE for DL communications. The TX beam resolution at the base station side may increase monotonically for channels (i.e., the beam resolution may increase or stay the same for each subsequent channel) in the order shown below:

SSB→GC-PDCCH→PDCCH→PDSCH (high to low order).

That is, the TX beam resolution may be higher for the lower order channels than it is for the higher order channels. For example, the TX beam resolution at the base station for PDSCH may be higher than or equal to the beam resolution for PDCCH, which may be higher than or equal to the beam resolution for GC-PDCCH, which may be higher than or equal to the beam resolution for SSB. Beams for channels of a higher order may be wider or equal in width to beams for channels of a lower order, which may reduce the overhead for TX beam sweep. At the UE side, the RX beam for higher order channels may simply be derived from RX beams for lower order channels during a RX beam sweep/update. E.g., the UE may derive the RX beam for PDCCH from the RX beam for PDSCH, and so on. It should be noted that as indicated above, "monotonically increasing" refers to "increasing or remaining the same", in other words, not decreasing. Hence, the TX beam resolution at the base station for PDSCH may be higher than or equal to the beam resolution for PDCCH, and so on and so forth.

Figure 10:
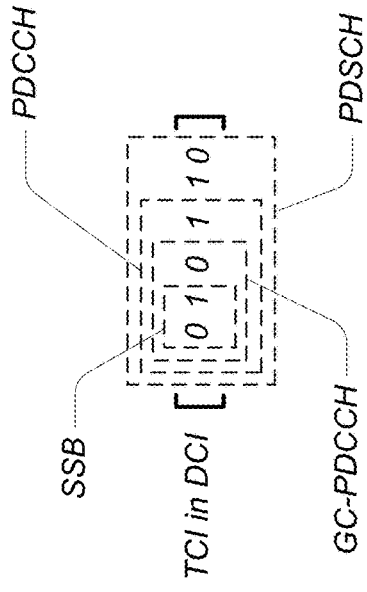
FIG. 10 shows an exemplary DCI configuration with extended TCI field to accommodate indications for a hierarchical beamforming structure, according to some embodiments.

In one sense, the RX beam for channels with higher order may be considered as a subset of the RX beam used for lower order channels. By using such a hierarchical structure, the overhead for RX beam tracking/update may be reduced. Thus, in some embodiments, the TCI field in DCI may be extended to indicate the beams for all four channels, as illustrated in FIG. 10. The number of bits used may depend on the number of beams supported for PDSCH in the cell. In other words, the number of bits used in TCI may correspond to the number of beams supported for the PDSCH in the cell. As illustrated in the example shown in FIG. 10, up to 6 bits may be used if up to 64 beams are to be supported at the base station (e.g. at gNB) for PDSCH. The setup of the bit mask for each channel in TCI format may be signaled during RRC connection setup. The example in FIG. 10 illustrates the two most significant bits providing the beam indication for SSB, the three most significant bits providing the beam indication for GC-PDCCH, the four most significant bits providing the beam indication for PDCCH, and all six bits providing the beam indication for PDSCH.

Figure 11:
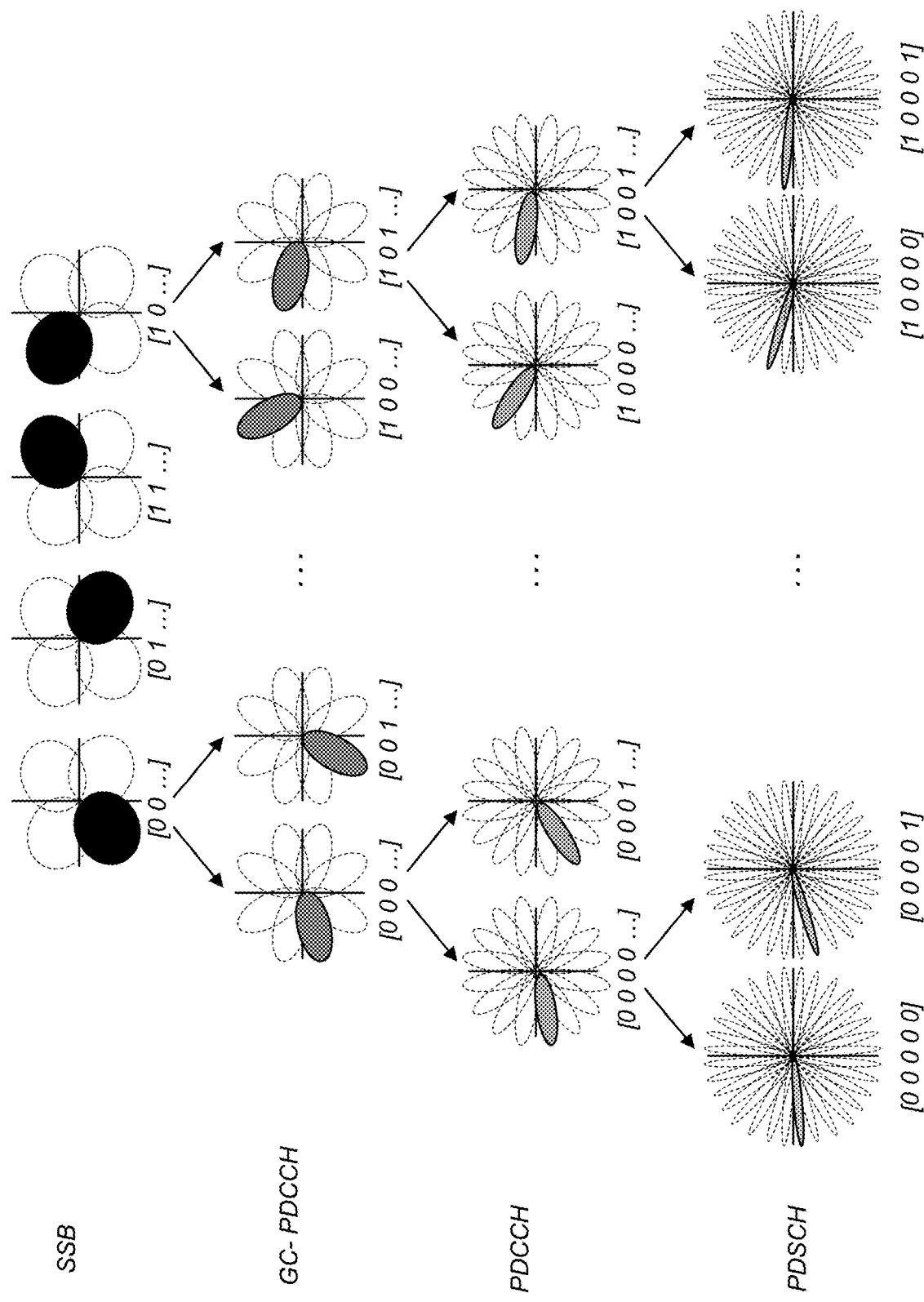
FIG. 11 shows an exemplary diagram illustrating a hierarchical beamforming structure with a 5-bit TCI, according to some embodiments.

FIG. 11 shows an exemplary diagram illustrating a hierarchical beamforming structure with a 5-bit TCI, according to some embodiments. The various shaded areas represent the indicated beams for the given resource. As seen in FIG. 11, the two most significant bits indicate the respective (possible) beam(s) for SSB. Because of the hierarchical structure, there may be two possible GC-PDCCH beams for (or corresponding to) each possible SSB beam, there may be two possible PDCCH beams for (or corresponding to) each possible GC-PDCCH beam, and finally, there may be two possible PDSCH beams for (or corresponding to) each possible PDCCH beam. Since the bit(s) indicating the beam for a lower order channel are of a lower significance than the bit(s) indicating the beam for a higher order channel, the RX beam for the higher order channel may be derived from the RX beam of the lower order channel. For example, the left beam for PDSCH in FIG. 11 is indicated by all five bits [00000], from which the four most significant bits indicate the beam for PDCCH, the three most significant bits indicate the beam for GC-PDCCH, and the two most significant bits indicate the beam for SSB.

Figure 12:
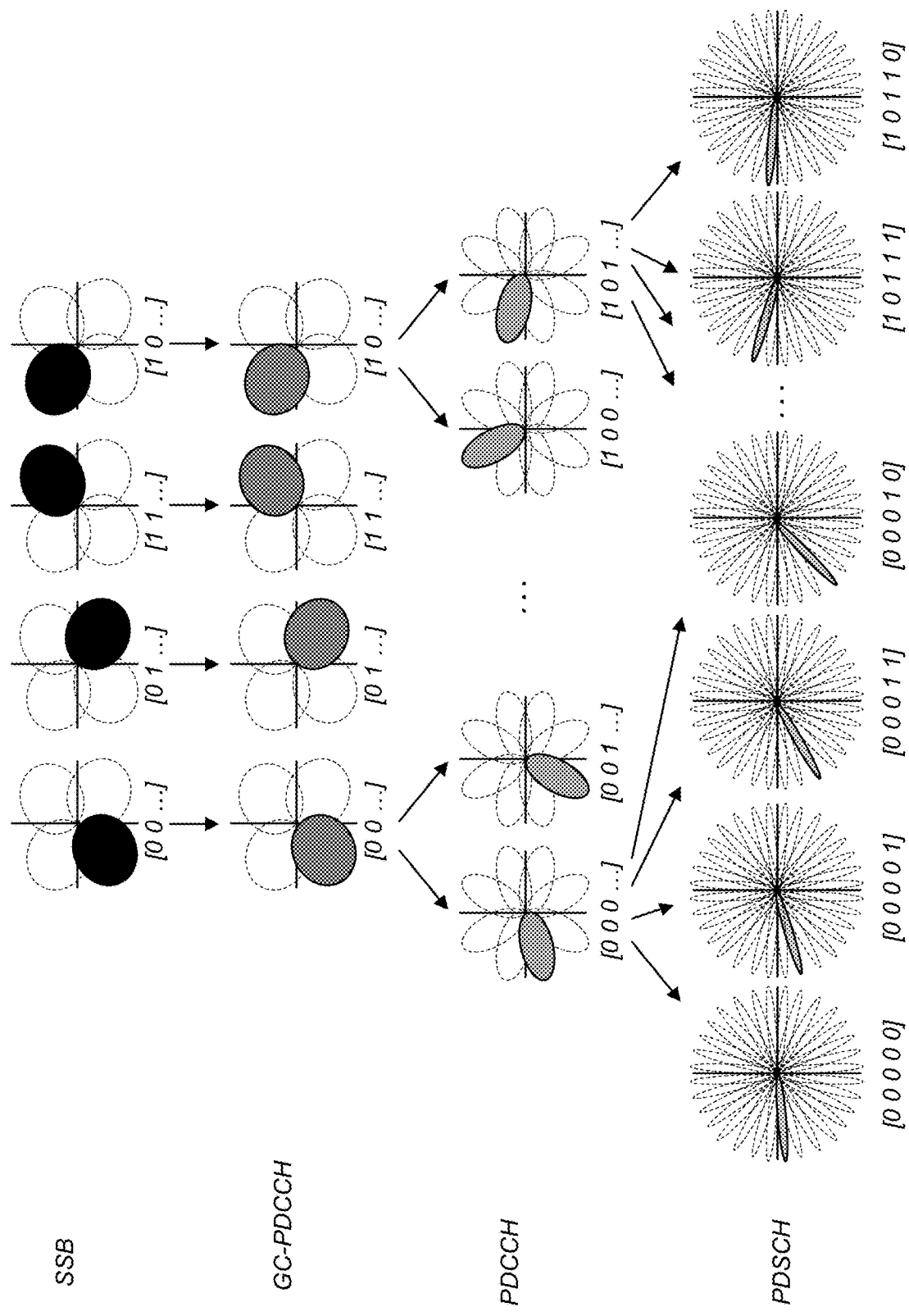
FIG. 12 shows an exemplary diagram illustrating a hierarchical beamforming structure with a 5-bit TCI and quasi co-located SSB (Synchronization Signal Block) and GC-PDCCH channels, according to some embodiments.

In some embodiments, channels with a lower order may have the same beam resolution as the channel with a higher order. FIG. 12 shows an exemplary diagram illustrating a hierarchical beamforming structure with a 5-bit TCI and quasi co-located SSB and GC-PDCCH channels, according to some embodiments. As shown in FIG. 12, the SSB and GC-PDCCH channels are quasi co-located, and thus have the same beam resolution. The channel without increased beam resolution may not need any dedicated bit(s) in the TCI format, and the channels with the same beam resolution may therefore be represented by the same bit(s). For example, as shown in FIG. 12, both the SSB and GC-PDCCH channels are represented by the two most significant bits. In other words, the two most significant bits indicate both the beam(s) for SSB and the beam(s) for GC-PDCCH.

Figure 13:
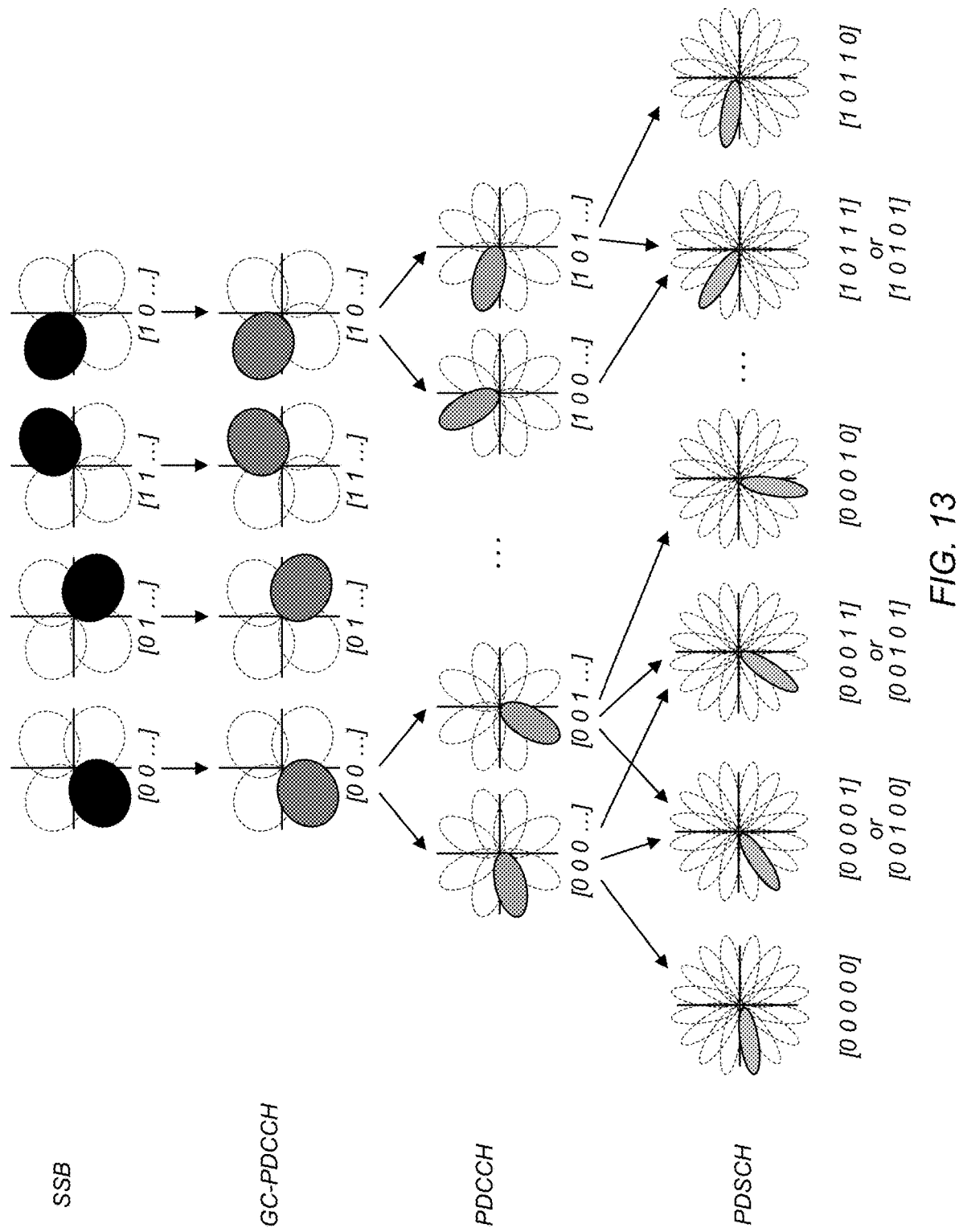
FIG. 13 shows an exemplary diagram illustrating a hierarchical beamforming structure with a 5-bit TCI, quasi co-located SSB and GC-PDCCH channels, and overlapped beams, according to some embodiments.

Furthermore, neighbor beams may also have overlapping child beams. FIG. 13 shows an exemplary diagram illustrating a hierarchical beamforming structure with a 5-bit TCI, quasi co-located SSB and GC-PDCCH channels, and overlapped beams, according to some embodiments. As shown in FIG. 13, two neighbor PDCCH beams may have the same children beams on PDSCH. In the specific example shown in FIG. 13, a first PDSCH beam may be identified by [00001] corresponding to the PDCCH beam identified by [000 . . . ], while also being identified by [00100] corresponding to the PDCCH beam identified by [001 . . . ]. Similarly, a second PDSCH beam may be identified by [00011] corresponding to the PDCCH beam identified by [000 . . . ], while also being identified by [00101] corresponding to the PDCCH beam identified by [001 . . . ]. The same end beam may therefore have different TCI indications, in this case two indications for the same beam. It should be noted that the overlapping beams enable the base station (e.g. a gNB) to change the UE's PDCCH beam without having to change (or adjust/alter) the PDSCH beams, which benefits the UE's mobility, especially when the UE is located at the intersection of two PDCCH beams. The same mobility improvement may also be observed on the SSB/GC-PDCCH level, if those levels also specify overlapping child beams.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a memory element storing information; and
a processing element configured to use at least a portion of the information to cause a device to:
receive, via wireless communications, downlink control information (DCI) comprising beamforming information arranged according to a hierarchical beamforming structure that provides beam indications for monitoring a plurality of different corresponding channels; and
monitor the plurality of different corresponding channels using respective corresponding receive beamforming configurations with beamforming for each respective corresponding beamforming configuration performed based at least on the received beam indications.

2. The apparatus of claim 1, wherein the DCI comprises a transmission configuration indication (TCI) state field, wherein the beam indications are provided in the TCI state field.

3. The apparatus of claim 1, wherein the beam indications are according to a specified number of bits that correspond to a beam resolution of a cell in which the wireless communications are conducted.

4. The apparatus of claim 1, wherein the processing element is further configured to cause the device to receive the DCI from a base station.

5. The apparatus of claim 1, wherein when the beam indications include a changed beam indication compared to previous beam indications received by the device in a previous DCI, an aggregation level for the DCI is higher than an aggregation level of the previous DCI.

6. The apparatus of claim 1, wherein when the beam indications include a changed beam indication compared to previous beam indications received by the device in a previous DCI, transmission of the DCI is limited to a specified aggregation level to reduce the possibility of a false cyclic redundancy check pass.

7. The apparatus of claim 1, wherein the beam indications include at least one beam indication for monitoring a next instance of a physical control channel.

8. The apparatus of claim 7, wherein the physical control channel comprises one or more of the following:
   a physical downlink control channel; or
   a group common physical downlink control channel.

9. A device comprising:
   radio circuitry configured to facilitate wireless communications of the device; and
   a processing element communicatively coupled to the radio circuitry and configured to cause the device to:
   receive, via wireless communications, downlink control information (DCI) comprising beamforming information arranged according to a hierarchical beamforming structure that provides beam indications for monitoring a a plurality of different corresponding channels; and
   monitor the plurality of different corresponding channels using respective corresponding receive beamforming configurations with beamforming for each respective corresponding beamforming configuration performed based at least on the received beam indications.

10. The device of claim 9, wherein the DCI comprises a transmission configuration indication (TCI) state field, wherein the beam indications are included in the TCI state field.

11. The device of claim 9, wherein the beam beam indications are according to a specified number of bits that correspond to a beam resolution of a cell in which the wireless communications are conducted.

12. The device of claim 9, wherein the beam indications include specific beam indications for monitoring a next instance of one or more of the following:
   a physical downlink control channel; or
   a group common physical downlink control channel.

13. The device of claim 9, wherein when the beam indications include a changed beam indication compared to previous beam indications received by the device in a previous DCI, an aggregation level for the DCI is higher than an aggregation level of the previous DCI.

14. The device of claim 9, wherein when the beam indications include a changed beam indication compared to previous beam indications received by the device in a previous DCI, transmission of the DCI is limited to a specified aggregation level to reduce the possibility of a false cyclic redundancy check pass.

15. A non-transitory memory element storing instructions executable by a processing element to cause a device to:
   receive, via wireless communications, downlink control information (DCI) comprising beamforming information arranged according to a hierarchical beamforming structure that provides beam indications for monitoring a plurality of different corresponding channels; and
   monitor the plurality of different corresponding channels using respective corresponding receive beamforming configurations with beamforming for each respective corresponding beamforming configuration performed based at least on the received beam indications.

16. The non-transitory memory element of claim 15, wherein the DCI comprises a transmission configuration indication (TCI) state field, wherein the beam indications are provided in the TCI state field according to a specified number of bits that correspond to a beam resolution of a cell in which the wireless communications are conducted.

17. The non-transitory memory element of claim 15, wherein the beam indications include specific beam indications for monitoring a next instance of one or more of the following:
   a physical downlink control channel; or
   a group common physical downlink control channel.

18. The non-transitory memory element of claim 15, wherein when the beam indications include a changed beam indication compared to previous beam indications received by the device in a previous DCI;
   wherein an aggregation level for the DCI is higher than an aggregation level of the previous DCI.

19. The non-transitory memory element of claim 15, wherein when the beam indications include a changed beam indication compared to previous beam indications received by the device in a previous DCI, transmission of the DCI is limited to a specified aggregation level to reduce the possibility of a false cyclic redundancy check pass.

20. The non-transitory memory element of claim 15, wherein according to the hierarchical beamforming structure, beam resolution is higher for lower order channels than it is for higher order channels.

* * * * *

UNITED STATES PATENT AND TRADEMARK OFFICE
CERTIFICATE OF CORRECTION

PATENT NO. : 11,272,576 B2
APPLICATION NO. : 16/245389
DATED : March 8, 2022
INVENTOR(S) : Wei Zhang et al.

Page 1 of 1

It is certified that error appears in the above-identified patent and that said Letters Patent is hereby corrected as shown below:

In the Claims

Column 23, Line 12, delete "a a" and substitute --a--.

Column 23, Line 24, delete "beam beam" and substitute --beam--.

Signed and Sealed this
Twentieth Day of June, 2023

Katherine Kelly Vidal
*Director of the United States Patent and Trademark Office*